United States Patent [19]
Florentine

[11] Patent Number: 6,099,340
[45] Date of Patent: Aug. 8, 2000

[54] WATERPROOF CONTAINER FOR ELECTRICAL PLUGS AND SOCKETS

[76] Inventor: Angela Florentine, 101 St. Andrews Pl., Newtown, Pa. 18940

[21] Appl. No.: 09/208,950

[22] Filed: Dec. 9, 1998

[51] Int. Cl.[7] .................................................. H01R 13/62
[52] U.S. Cl. ............................................ 439/367; 439/521
[58] Field of Search ..................................... 439/367, 369, 439/371, 521, 370, 936

[56] References Cited

U.S. PATENT DOCUMENTS

| | | | |
|---|---|---|---|
| 4,749,363 | 6/1988 | Lusak et al. | 439/367 |
| 5,129,839 | 7/1992 | VanSkiver | 439/367 |
| 5,147,216 | 9/1992 | Shotey | 439/367 |
| 5,347,084 | 9/1994 | Roney et al. | 174/92 |
| 5,674,089 | 10/1997 | Sampson | 439/521 |
| 5,755,588 | 5/1998 | Sweatman et al. | 439/369 |
| 5,913,692 | 6/1999 | Targett | 439/369 |

*Primary Examiner*—Lincoln Donovan
*Assistant Examiner*—Eugene G. Byrd
*Attorney, Agent, or Firm*—Henderson & Sturm LLP

[57] ABSTRACT

A waterproof container 10 for electrical plugs 100 and electrical sockets 101 provided with electrical cords 102 wherein the container 10 includes a waterproof housing member 20 having upper 21 and lower 22 housing segments hingedly connected together and provided with a locking arrangement 27, 28. The opposite ends of both of the housing segments 21, 22 are provided with arcuate recesses 24 which are dimensioned to receive foam gaskets 41 which will sealingly engage the electrical cords 102 and at least one of the housing segments is provided with a pair of internal peripheral recesses 29 dimensioned to receive gasket members 40 to make the container 10 waterproof.

5 Claims, 1 Drawing Sheet

WATERPROOF CONTAINER FOR ELECTRICAL PLUGS AND SOCKETS

BACKGROUND OF THE INVENTION

1. Field of the Invention

The present invention relates to the field of electrical plug safety devices in general, and in particular to a waterproof container for electrical plugs and sockets.

2. Description of Related Art

As can be seen by reference to the following U.S. Pat. Nos. 4,749,363; 5,147,216; 5,347,084; and 5,674,089, the prior art is replete with myriad and diverse enclosure constructions designed to cover a joined electrical plug and socket arrangement.

While all of the aforementioned prior art constructions are more than adequate for the basic purpose and function for which they have been specifically designed, they are uniformly deficient with respect to their failure to provide a simple, efficient, and practical plug enclosure that provides a substantially waterproof container for the juncture of an electrical plug and socket arrangement intended for outdoor usage.

As anyone who has strung outside Christmas lights is all too well aware, the common approach of wrapping duct tape around the electrical connections to provide a degree of waterproofing is an impractical solution to a very common problem, particularly since it is not a very effective technique to begin with and the tape residue is very difficult to remove before the light strings are returned to storage.

As a consequence of the foregoing situation, there has existed a longstanding need for a new and improved type of waterproof container for electrical plugs and sockets that can quickly and easily be installed in a surrounding relationship relative to the electrical connection, and the provision of such a construction is a stated objective of the present invention.

BRIEF SUMMARY OF THE INVENTION

Briefly stated, the waterproof container for electrical plugs and electrical sockets that forms the basis of the present invention comprises a housing unit and a sealing unit operatively associated with the housing unit to sealingly engage the cords of the plugs and sockets so that water cannot enter into the interior of the housing unit.

As will be explained in greater detail further on in the specification, the housing unit includes two housing segments hingedly connected together and provided with a locking arrangement wherein the inner periphery of one of the housing segments and the opposite sides of both housing segments are provided with recesses dimensioned to receive the sealing unit which will both sealingly engage the cords of the plugs and sockets, as well as make the internal periphery of the housing member waterproof.

In addition, the sealing unit includes a pair of relatively thin gasket members and two opposed pairs of relatively thick foam gaskets.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
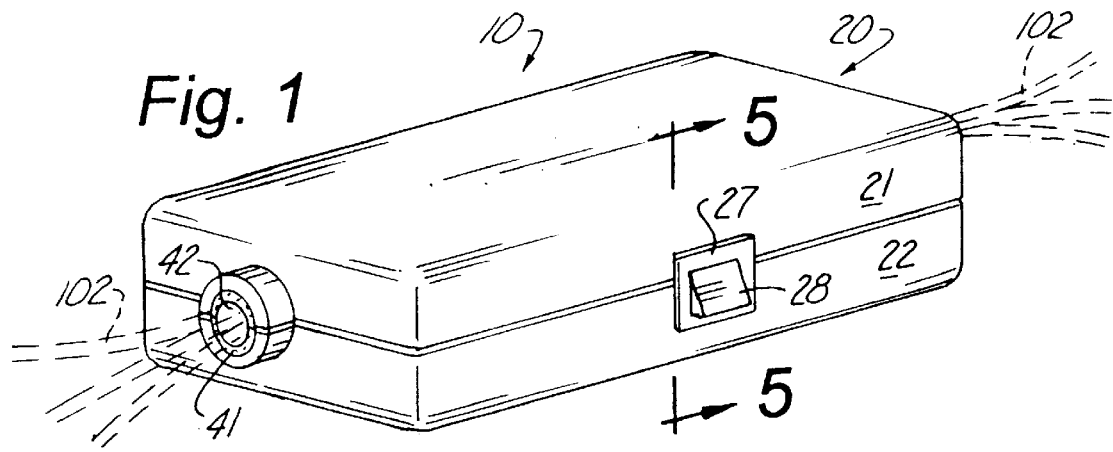
FIG. 1 is a perspective view of the waterproof container for electrical plugs and sockets in the closed position.

As can be seen by reference to the drawings, and in particularly to FIG. 1, the waterproof container for electrical plugs and sockets that forms the basis of the present invention is designated generally by the reference number 10. The container 10 comprises in general, a housing unit 11, and a sealing unit 12. These units will now be described in seriatim fashion.

Figure 2:
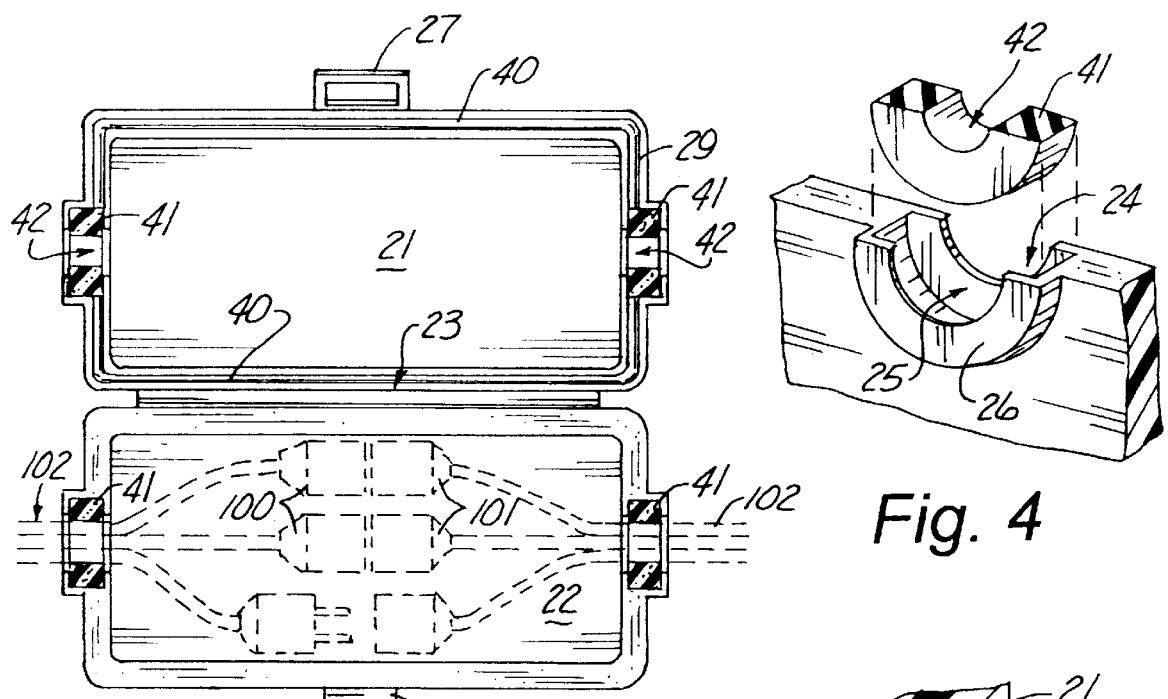
FIG. 2 is a top plan view of the container in the open position.
Figure 4:
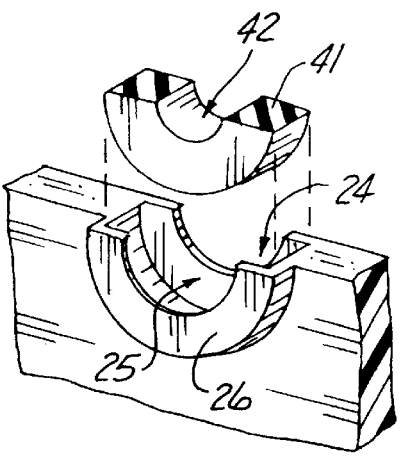
FIG. 4 is an exploded perspective view of the lower end of the sealing gasket.

As can be seen by reference to FIGS. 1, 2, and 4, the housing unit 11 comprises a generally rectangular waterproof housing member 20 including two generally identical rectangular housing segments 21, 22 hingedly connected together as at 23. Each housing segment 21, 22 is provided with a pair of relatively wide arcuate recesses 24 which define opposed semi-circular openings 25 aligned along the longitudinal axis of each housing segment 21, 22.

In addition, each of the generally semi-circular recesses 24 are formed in an outwardly extending projection 26 formed on the opposite ends of each housing segment 21, 22 for reasons that will be explained in greater detail further on in the specification.

Figure 5:
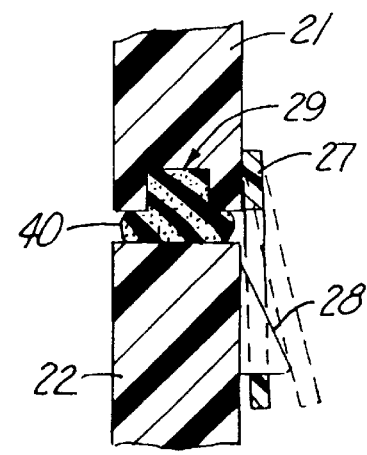
FIG. 5 is a cross sectional view taken through line 5—5 of FIG. 1.

Turning now to FIGS. 1 and 5, it can be seen that the free ends of both the upper 21 and lower 22 housing segments are provided with a latch 27 and catch 28 locking arrangement for captively engaging the housing segments 21, 22 together in the closed position.

Figure 3:
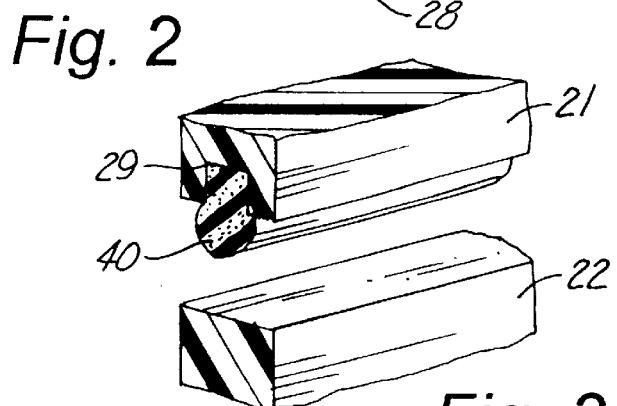
FIG. 3 is an isolated detail view of the peripheral sealing arrangement.

Furthermore, as shown in FIGS. 2, 3, and 5, at least the upper housing segment 21 is provided with a pair of U-shaped internal peripheral recesses 29 whose purpose and function will be described presently.

As can best be seen by reference to FIGS. 2 through 5, the sealing unit 12 comprises a pair of generally U-shaped relatively thin gasket members 40 dimensioned to be received in the pair of peripheral recesses 29 in the upper housing segment 21 and two opposed pairs of relatively thick generally C-shaped foam gaskets 41 having a semi-circular opening 42 and which are dimensioned to be received in the arcuate recesses 24 formed on the opposite ends of the upper and lower housing segments 21, 22.

Turning now to FIGS. 1 and 2, it can be appreciated that the interior of the waterproof housing member 20 is dimensioned to receive a plurality of electrical plugs 100 and complementary electrical sockets 101. The periphery of the electrical cord 102 associated with the plugs 100 and sockets 101 are sealingly engaged by the opposed enlarged C-shaped foam gaskets 41 which cooperate with the relatively thin U-shaped gasket members 40 to make the interior of the housing member 20 waterproof.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A waterproof container for an electrical plug and an electrical socket both of which being provided with electrical cords wherein the waterproof container comprises:

a housing unit including a waterproof housing member having an upper and a lower housing segment hingedly connected on one end and provided with a locking arrangement on the other end; wherein, the opposite ends of both the upper and lower housing segments are provided with opposed arcuate recesses which define opposed openings on opposite sides of the housing member; and wherein, at least one of the housing segments is provided with a pair of generally U-shaped internal peripheral recesses; wherein each generally U-shaped internal peripheral recess extends from one side of each of the arcuate recesses on the opposite sides of said at least one of the housing segments; and a sealing unit including two opposed pairs of generally C-shaped foam gaskets dimensioned to be received in said opposed arcuate recesses in the opposite ends of both the upper and lower housing segments and a pair of generally U-shaped gasket members dimensioned to be received in said pair of internal peripheral recesses to form a continuous sealing engagement around the opposed surfaces of upper and lower housing segments when the housing seaments are disposed in their closed position.

2. The container as in claim 1 wherein the opposed ends of the housing segments are provided with outwardly extending projections and said arcuate recesses are formed in said projections.

3. The container as in claim 2 wherein said opposed openings are aligned along the longitudinal axis of the housing member.

4. The container as in claim 3 wherein the foam gaskets are relatively thick as compared to the gasket members.

5. The container as in claim 4 wherein the peripheral recesses and the gasket members are provided in the upper housing segment.

* * * * *